(12) United States Patent
Xue et al.

(10) Patent No.: US 10,378,999 B2
(45) Date of Patent: Aug. 13, 2019

(54) BUSHING ASSEMBLY HEIGHT CHECKING FIXTURE

(71) Applicant: CITIC Dicastal CO., LTD., Qinhuangdao, Hebei (CN)

(72) Inventors: Bowen Xue, Qinhuangdao (CN); Jiandong Guo, Qinhuangdao (CN); Yongwang Zhao, Qinhuangdao (CN)

(73) Assignee: CITIC Dicastal CO., LTD., Qinhuangda, Hebei (CN)

( * ) Notice: Subject to any disclaimer, the term of this patent is extended or adjusted under 35 U.S.C. 154(b) by 175 days.

(21) Appl. No.: 15/625,283

(22) Filed: Jun. 16, 2017

(65) Prior Publication Data

US 2018/0202898 A1 Jul. 19, 2018

(30) Foreign Application Priority Data

Jan. 18, 2017 (CN) .......................... 2017 1 0035306

(51) Int. Cl.
| | |
|---|---|
| *G01M 17/06* | (2006.01) |
| *G01M 13/04* | (2019.01) |
| *G01B 5/00* | (2006.01) |
| *B62D 65/00* | (2006.01) |
| *B62D 7/18* | (2006.01) |
| *G01B 5/06* | (2006.01) |

(52) U.S. Cl.
CPC .............. *G01M 13/04* (2013.01); *B62D 7/18* (2013.01); *B62D 65/005* (2013.01); *G01B 5/0025* (2013.01); *G01B 5/061* (2013.01)

(58) Field of Classification Search
USPC .............................. 73/117.01, 117.02, 117.03
See application file for complete search history.

(56) References Cited

U.S. PATENT DOCUMENTS

| | | | | |
|---|---|---|---|---|
| 6,035,541 A | * | 3/2000 | Choi ...................... | G01B 5/146 33/517 |
| 6,061,917 A | * | 5/2000 | Graf ...................... | B23P 11/027 33/201 |
| 6,209,183 B1 | * | 4/2001 | Bugosh ............... | B25B 27/0028 29/280 |

(Continued)

FOREIGN PATENT DOCUMENTS

| | | |
|---|---|---|
| CN | 201476730 U | 5/2010 |
| CN | 201497469 U | 6/2010 |

(Continued)

*Primary Examiner* — Eric S. McCall
(74) *Attorney, Agent, or Firm* — Cooper Legal Group, LLC

(57) ABSTRACT

Disclosed is a bushing assembly height checking fixture, which is composed of a jacket, set screws, a measuring cylinder and a positioning cylinder. When the bushing assembly height checking fixture is used, the lower cone of the positioning cylinder is fitted with the orifice edge of an inner shaft hole of a bushing, and the checking fixture is positioned radially; the bottom surface of the jacket is flush with the assembly positioning end face of a workpiece, and the checking fixture is positioned axially; then the bottom surface of the measuring cylinder is flush with the end face of the bushing, the position of the top surface of the measuring cylinder is observed, and if the top surface of the measuring cylinder is in the middle of the top step of the jacket, it shows that the height after the workpiece is assembled is qualified.

1 Claim, 2 Drawing Sheets

(56) References Cited

U.S. PATENT DOCUMENTS

2018/0207757 A1* 7/2018 Eralti ..................... G01D 3/08

FOREIGN PATENT DOCUMENTS

| CN | 201706994 U | 1/2011 |
| --- | --- | --- |
| CN | 201715992 U | 1/2011 |
| CN | 105352414 A | 2/2016 |
| CN | 105547094 A | 5/2016 |
| CN | 205228335 U | 5/2016 |
| CN | 105890499 A | 8/2016 |
| CN | 206378086 U | 8/2017 |

* cited by examiner

US 10,378,999 B2

BUSHING ASSEMBLY HEIGHT CHECKING FIXTURE

CROSS-REFERENCE TO RELATED APPLICATIONS

This application is filed based upon and claims priority to Chinese Patent Application No. 201710035306.4, filed on Jan. 18, 2017, the entire contents of which are incorporated herein by reference.

TECHNICAL FIELD

The present disclosure relates to a checking fixture, and specifically to a checking fixture for measuring the height of a bushing and a steering knuckle after assembled.

BACKGROUND

The automobile chassis is one of important components of a whole automobile, and the reasonability of its design determines the safety and comfort of the whole automobile. Noise is an important index for evaluating the comfort, and a bushing is assembled in a hole of a part such as a steering knuckle or a steering arm or the like in interference fit to reduce the noise and vibration. After the bushing is assembled, the part such as the steering knuckle or the like is further connected with other part, so the dimension after assembly is one of acceptance standards for evaluating whether the assembly is qualified. The dimensional requirements after some bushings are assembled are relatively strict, and the dimensions are difficult to measure with conventional measuring tools such as calipers and the like. The present disclosure can measure the dimension of a assembled bushing very conveniently and quickly.

SUMMARY

The object of the present disclosure is to provide a checking fixture, which can measure the height difference between a bushing and a steering knuckle after assembled.

In order to achieve the above object, the present disclosure adopts the technical solution: a bushing assembly height checking fixture is composed of a jacket, a set screw I, a measuring cylinder, a positioning cylinder and a second set screw. The outer cylindrical surface of the measuring cylinder is fitted with the inner wall of the jacket in a fit clearance of 0.005 mm; the first set screw is installed on the jacket, and the tail end of the first set screw is fitted with a chute in the measuring cylinder; the outer cylindrical surface of the positioning cylinder is fitted with the inner wall of the measuring cylinder in a fit clearance of 0.01 mm; the second set screw is installed on the measuring cylinder, and the tail end of the second set screw is fitted with a chute in the positioning cylinder.

The top surface of the jacket is step-shaped, the boundary of steps is on the diameter, the height difference of the steps is A, and the tolerance is (−0.02, 0). When the top surface of the measuring cylinder is on the same height as the lower step surface of the top surface of the jacket, the bottom surface of the measuring cylinder is A/2 higher than that of the jacket, and the tolerance is (0, +0.02).

The intersecting lines of the inner wall of the jacket and the two semicircular step surfaces of the top surface thereof are sharp-angled. The intersecting line of the top surface and cylindrical surface of the measuring cylinder is also sharp-angled. The lower end of the positioning cylinder is conical.

In practical use, the lower cone of the positioning cylinder is fitted with the orifice edge of an inner shaft hole of the bushing, and the checking fixture is positioned radially; the bottom surface of the jacket is flush with the assembly positioning end face of a workpiece, and the checking fixture is positioned axially; then the bottom surface of the measuring cylinder is flush with the end face of the bushing, the position of the top surface of the measuring cylinder is observed, and if the top surface of the measuring cylinder is in the middle of the top step of the jacket, it shows that the height after the workpiece is assembled is qualified.

The checking fixture of the present disclosure in use can measure the height difference between the bushing and the steering knuckle after assembled, and simultaneously has the characteristics of simple structure, high detection precision, safety, stability, low manufacturing cost and the like.

Figure 1:
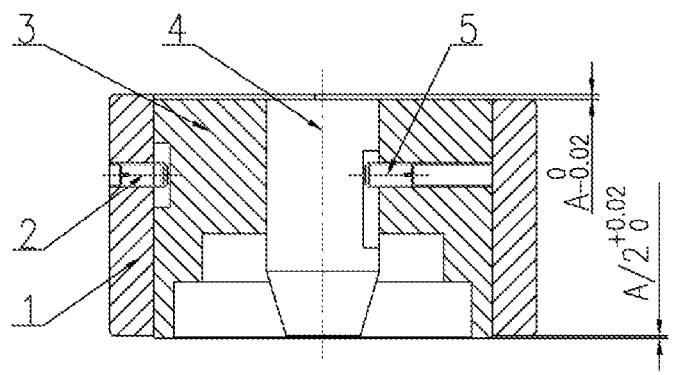
FIG. 1 is a front view of a bushing assembly height checking fixture of the present disclosure.
Figure 2:
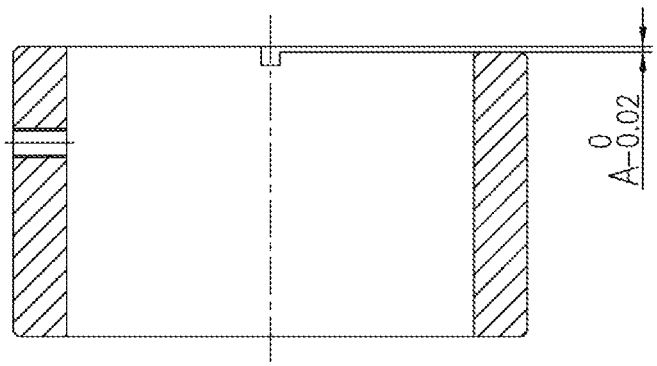
FIG. 2 is a structural schematic diagram of a jacket of the bushing assembly height checking fixture of the present disclosure.
Figure 3:
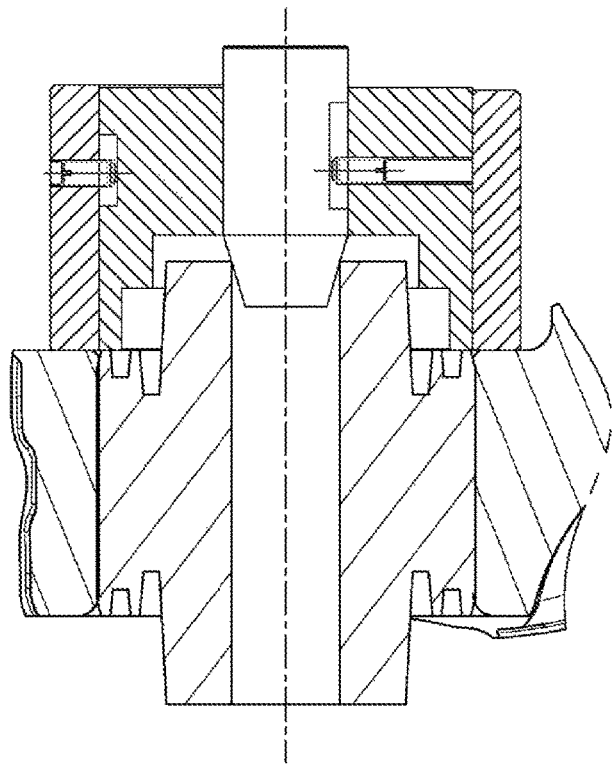
FIG. 3 is a schematic diagram when the bushing assembly height checking fixture of the present disclosure detects a workpiece.
Figure 4:
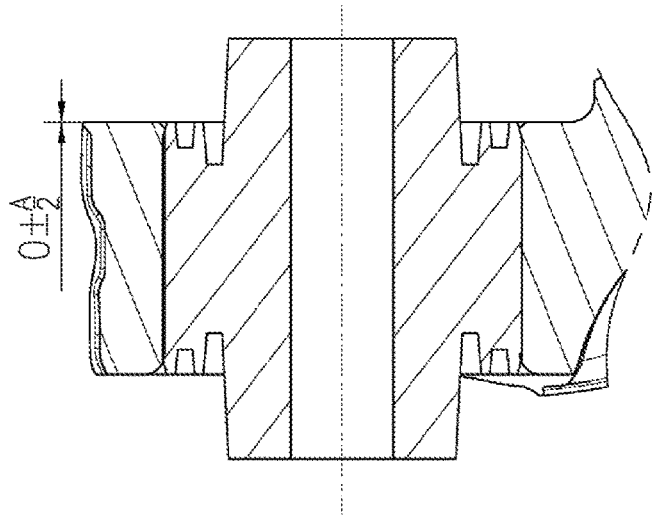
FIG. 4 is a structural schematic diagram of the measured workpiece.

LIST OF REFERENCE SYMBOLS 1 jacket
2 first set screw
3 measuring cylinder
4 positioning cylinder
5 second set screw

DETAILED DESCRIPTION

Details and working conditions of a specific device provided by the present disclosure will be described below in combination with the accompanying drawings.

The device is composed of a jacket 1, a first set screw 2, a measuring cylinder 3, a positioning cylinder 4 and a second set screw 5. The outer cylindrical surface of the measuring cylinder 3 is fitted with the inner wall of the jacket 1 in a fit clearance of 0.005 mm; the first set screw 2 is installed on the jacket 1, and the tail end of the first set screw 2 is fitted with a chute in the measuring cylinder 3; the outer cylindrical surface of the positioning cylinder 4 is fitted with the inner wall of the measuring cylinder 3 in a fit clearance of 0.01 mm; the second set screw 5 is installed on the measuring cylinder 3, and the tail end of the second set screw 5 is fitted with a chute in the positioning cylinder 4.

The top surface of the jacket 1 is step-shaped, the boundary of the steps is on the diameter, and the height difference between the steps is A, the tolerance of which is (−0.02, 0). When the top surface of the measuring cylinder 3 is on the same height as the lower step surface of the top surface of the jacket 1, the bottom surface of the measuring cylinder 3 is A/2 higher than that of the jacket 1, the tolerance of which is (0, +0.02).

The intersecting lines of the inner wall of the jacket 1 and the two semicircular step surfaces of the top surface thereof are sharp-angled. The intersecting line of the top surface and cylindrical surface of the measuring cylinder 3 is also sharp-angled. The lower end of the positioning cylinder 4 is conical.

In the working process, the lower cone of the positioning cylinder 4 is fitted with the orifice edge of an inner shaft hole of a bushing, and the checking fixture is positioned radially; the bottom surface of the jacket 1 is flush with the assembly positioning end face of a workpiece, and the checking fixture is positioned axially; then the bottom surface of the measuring cylinder 3 is flush with the end face of the bushing, the position of the top surface of the measuring cylinder 3 is observed, and if the top surface of the measuring cylinder 3 is in the middle of the top step of the jacket 1, it shows that the height of the assembled workpiece is qualified.

What is claimed is:

1. A bushing assembly height checking fixture, being composed of:
    a jacket,
    a first set screw,
    a measuring cylinder,
    a positioning cylinder, and
    a second set screw,
    wherein:
        an outer cylindrical surface of the measuring cylinder is fitted with an inner wall of the jacket in a fit clearance of 0.005 mm;
        the first set screw is installed on the jacket and a tail end of the first set screw is fitted with a chute in the measuring cylinder;
        an outer cylindrical surface of the positioning cylinder is fitted with an inner wall of the measuring cylinder in a fit clearance of 0.01 mm;
        the second set screw is installed on the measuring cylinder and a tail end of the second set screw is fitted with a chute in the positioning cylinder;
    a top surface of the jacket is step-shaped and comprises two semicircular step surfaces, a boundary of the two semicircular step surfaces is on a diameter of the jacket, there is a height difference between the two semicircular step surfaces and a tolerance of the height difference between the two semicircular step surfaces is between 0.02 and 0;
    when a top surface of the measuring cylinder is on a same height as a lower step surface of the top surface of the jacket, a bottom surface of the measuring cylinder is higher than a bottom surface of the jacket, a height difference between the bottom surface of the measuring cylinder and the bottom surface of the jacket is half of the height difference between the two semicircular step surfaces and a tolerance of the height difference between the bottom surface of the measuring cylinder and the bottom surface of the jacket is between 0 and 0.02;
    the inner wall of the jacket and the two semicircular step surfaces of the top surface of the jacket form intersecting lines, and the intersecting lines of the inner wall of the jacket and the two semicircular step surfaces of the top surface of the jacket are sharp-angled;
    an intersecting line of the top surface of the measuring cylinder and outer cylindrical surface of the measuring cylinder is also sharp-angled; and
    a lower end of the positioning cylinder is conical.

* * * * *